US012739632B2

(12) United States Patent
Del Sordo et al.

(10) Patent No.: US 12,739,632 B2
(45) Date of Patent: Sep. 15, 2026

(54) AUTOMATIC ACCESS CONFIGURATION FOR AUTOMATIC AUTHORIZATION OF A CLIENT DEVICE TO RECEIVE AN ACCESS PARAMETER

(71) Applicant: Thomson Licensing, Cesson-Sevigne (FR)

(72) Inventors: Christopher S. Del Sordo, Souderton, PA (US); Albert F. Elcock, West Chester, PA (US); Christopher R. Boyd, Chalfont, PA (US); Kurt A. Lumbatis, Dacula, GA (US)

(73) Assignee: Thomson Licensing, Cesson-Sevigne (FR)

( * ) Notice: Subject to any disclaimer, the term of this patent is extended or adjusted under 35 U.S.C. 154(b) by 164 days.

(21) Appl. No.: 18/077,415

(22) Filed: Dec. 8, 2022

(65) Prior Publication Data

US 2023/0199488 A1 Jun. 22, 2023

Related U.S. Application Data

(60) Provisional application No. 63/290,785, filed on Dec. 17, 2021.

(51) Int. Cl.

| | |
|---|---|
| ***H04W 12/06*** | (2021.01) |
| ***H04W 76/11*** | (2018.01) |
| *H04W 84/12* | (2009.01) |

(52) U.S. Cl.

CPC .......... *H04W 12/068* (2021.01); *H04W 76/11* (2018.02); *H04W 84/12* (2013.01)

(58) Field of Classification Search

CPC .................................................. H04W 12/068

See application file for complete search history.

(56) References Cited

U.S. PATENT DOCUMENTS 9,066,227 B2 * 6/2015 Spencer ................ H04W 76/10
11,284,258 B1 * 3/2022 Wei ......................... H04L 63/10

(Continued)

FOREIGN PATENT DOCUMENTS

EP 3151610 A1 * 4/2017 ............ H04W 12/08

OTHER PUBLICATIONS

Benenson et al., "An Algorithmic Framework for Robust Access Control in Wireless Sensor Networks", 8 pages, copyright: 2005. ( Year: 2005).*

*Primary Examiner* — Ponnoreay Pich

(74) *Attorney, Agent, or Firm* — James Shead; David Todd Shoneman; Michael A. Pugel

(57) ABSTRACT

Providing an automatic access configuration (AAC) that is customizable allows for automatic authorization of a client device to receive one or more access parameters via a requestor access point connection so as to access a network associated with an access point device each time the client device transitions within proximity of the network or each time an update is made to the network. The (AAC) can include one or more access parameters that identify client devices, users, or both that are permitted to access a network without requiring any manual input by a user. The (AAC) can be customizable so as to be updated according to the changing requirements of the network. Rather than requiring a user to provide input, the (AAC) can be accessed by the access point device to determine whether a specific client device should be authorized and provided access to a network automatically.

20 Claims, 7 Drawing Sheets

(56) References Cited

U.S. PATENT DOCUMENTS

2007/0147318 A1* 6/2007 Ross ..................... H04W 48/16 370/338
2008/0040486 A1* 2/2008 Kezys ..................... H04W 8/18 709/227
2010/0182959 A1* 7/2010 Cook ................... H04M 11/062 370/329
2011/0243033 A1* 10/2011 Won ...................... H04W 48/20 370/254
2012/0010923 A1* 1/2012 Yarmolich ............. G06Q 20/10 709/224
2014/0140331 A1* 5/2014 Lee ......................... H04L 63/10 370/338
2016/0044036 A1* 2/2016 Bestermann .......... H04L 63/101 726/4
2016/0134469 A1* 5/2016 Carter ................... H04W 76/14 370/254
2017/0164196 A1* 6/2017 Bryksa .................. H04L 63/083
2018/0070271 A1* 3/2018 McCann ............. H04W 12/062
2018/0167389 A1* 6/2018 Zou ....................... H04W 12/08
2019/0246277 A1* 8/2019 Hamzeh ................ H04W 12/08
2020/0274935 A1* 8/2020 Lekontsev ............ H04L 67/146
2023/0199488 A1* 6/2023 Del Sordo ............ H04W 76/11 726/5

* cited by examiner

AUTOMATIC ACCESS CONFIGURATION FOR AUTOMATIC AUTHORIZATION OF A CLIENT DEVICE TO RECEIVE AN ACCESS PARAMETER

BACKGROUND

Many network environments that utilize a wireless fidelity (Wi-Fi) network include multiple devices, such as an access point, an extender, various client devices, any other devices, etc. Generally, Wi-Fi networks require the use of some type of security, such as one or more network credentials, for example, a network password, that can be based on a variety of security protocols, for example, wired equivalent privacy (WEP), Wi-Fi protected access (WPA), WPA II (WPA2), WPA III (WPA3), etc. This security provides for secure access to the network. Typically, if a client device comes within proximity of a Wi-Fi network, the Wi-Fi network will prompt for a Wi-Fi password prior to allowing access to the Wi-Fi network. Typically, the prompt requires that a user of the client device obtain the Wi-Fi password and then manually enter that Wi-Fi password at the client device. Such manual entry can be a time consuming and error prone effort. Additionally, a network environment can include multiple Wi-Fi access points with each having a unique service set identifier (SSID) and associated password which increases the time and/or resources required for configuration of a client device attempting to access the Wi-Fi network. In many cases, the client device should be allowed access to the Wi-Fi network whenever the client device comes within proximity of the Wi-Fi network as the client device is trusted or is an otherwise authorized device.

Thus, there is a need for an automated authorization of a client device to receive one or more access parameters associated with a Wi-Fi network so that the client device can use the one or more access parameters to access the Wi-Fi network.

SUMMARY

According to one or more aspects of the present disclosure there are provided novel solutions for an automatic access configuration for automatically authorizing or providing a client device one or more access parameters associated with a Wi-Fi network so as to allow the client device to access the Wi-Fi network. For example, a Wi-Fi network can require one or more access parameters, such as one or more network credentials (for example, a network password or other secure network identifier) be provide by a client device before the client device is allowed to access the Wi-Fi network. Today, client devices are routinely transitioned between various Wi-Fi networks or even transitioned to within proximity of the same Wi-Fi network at different times and/or different locations via one or more access point devices. Available technologies typically share Wi-Fi credentials via Bluetooth, some type of user interactive sharing, such as a quick response (QR) code, or other user interactive input to provide a network connection access to a Wi-Fi network. However, none of these available technologies are completely automated. The present invention provides support for various client devices to automatically and seamlessly obtain one or more access parameters associated with or otherwise required by a Wi-Fi network by utilizing an automatic access configuration that includes the necessary information to authorize a client device to receive the required one or more access parameters associated with the Wi-Fi network. A user, such as an administrator, with required privileges can configure the Wi-Fi network with the automatic access configuration that includes, for example, one or more access parameters, such that when a client device comes within proximity of the Wi-Fi network, the client device can automatically be provided to the one or more access parameters associated with the Wi-Fi network based on the automatic access configuration.

By providing an automatic access configuration that can be configured so as to be customized to a specific network, there is no need for communications between on-site devices via alternate wireless technologies such as Bluetooth or 4G/5G for transfer of Wi-Fi credentials. The present disclosure provides for one or more requestors (one or more client devices and/or users associated with a client device) to be authorized such that an access point device can automatically transfer one or more access parameters (such as one or more network credentials or other information) necessary to obtain access to a Wi-Fi network based on the automatic access configuration without requiring any manual initiation of a network connection or user intervention, alleviating the need for manual configuration for authorized users and/or client devices that attempt to access the network.

An aspect of the present disclosure provides an access point device for a client device to receive one or more access parameters associated with a wireless fidelity (Wi-Fi) network. The access point device comprises a memory storing one or more computer-readable instructions and a processor. The processor is configured to execute the one or more computer-readable instructions to establish a requestor access point connection with the client device based one or more requestor credentials received from the client device, receive a client device identifier from the client device via the requestor access point connection, compare the client device identifier to one or more requestor identifiers of an automatic access configuration, send, based on the comparison, the one or more access parameters to the client device via the requestor access point connection, wherein the one or more access parameters are required for access to the Wi-Fi network, and disconnect the client device from the requestor access point connection.

In an aspect of the present disclosure, the processor is further configured to execute the one or more computer-readable instructions to receive one or more automatic access configuration parameters from the client device and update the automatic access configuration based on the one or more automatic access configuration parameters.

In an aspect of the present disclosure, the processor is further configured to execute the one or more computer-readable instructions to receive a probe request message from the client device, and send a probe response message to the client device, wherein the probe response message comprises the one or more requestor credentials.

In an aspect of the present disclosure, wherein the probe request response comprises a vendor specific information element, and wherein the vendor specific information element comprises a requestor service set identifier (SSID), a requestor password, or both.

In an aspect of the present disclosure, wherein the establishing a requestor access point connection with the client device comprises comparing the one or more requestor credentials to a requestor identifier of an automatic access configuration, wherein the requestor identifier comprises a device identifier, a user identifier, or both.

In an aspect of the present disclosure, wherein one or more of the requestor access point connection is a secure connection, and the one or more access parameters comprise an update for one or more of the one or more access parameters.

In an aspect of the present disclosure, the processor is further configured to execute the one or more computer-readable instructions to receive, from a network resource, one or more network credentials associated with one or more access point devices, wherein the one or more access point devices are associated with one or more Wi-Fi networks, and send the one or more network credentials to the client device so as to allow the client device to access the one or more Wi-Fi networks.

An aspect of the present disclosure provides a method for automatically authorizing a client device to receive one or more access parameters associated with a wireless fidelity (Wi-Fi) network. The method comprises establishing a requestor access point connection with the client device based one or more requestor credentials received from the client device, receiving a client device identifier from the client device via the requestor access point connection, comparing the client device identifier to one or more requestor identifiers of an automatic access configuration, and disconnecting the client device from the requestor access point connection.

In an aspect of the present disclosure, the method further comprises receiving one or more automatic access configuration parameters from the client device, and updating the automatic access configuration based on the one or more automatic access configuration parameters.

In an aspect of the present disclosure, the method further comprises receiving a probe request message from the client device, and sending a probe response message to the client device, wherein the probe response message comprises the one or more requestor credentials.

In an aspect of the present disclosure, the method such that wherein the probe request response comprises a vendor specific information element, wherein the vendor specific information element comprises a requestor service set identifier (SSID), a requestor password, or both.

In an aspect of the present disclosure, the method such that wherein the establishing a requestor access point connection with the client device comprises comparing the one or more requestor credentials to a requestor identifier of an automatic access configuration, wherein the requestor identifier comprises a device identifier, a user identifier, or both.

In an aspect of the present disclosure, the method such that wherein one or more of the requestor access point connection is a secure connection, and the one or more access parameters comprise an update to one or more of the one or more access parameters.

In an aspect of the present disclosure, the method further comprises receiving, from a network resource, one or more network credentials associated with one or more access point devices, wherein the one or more access point devices are associated with one or more Wi-Fi networks, and sending the one or more network credentials to the client device so as to allow the client device to access the one or more Wi-Fi networks An aspect of the present disclosure provides a non-transitory computer-readable medium of an access point device storing one or more computer-readable instructions for automatically authorizing a client device to receive one or more access parameters associated with a wireless fidelity (Wi-Fi) network, the one or more computer-readable instructions that when executed by a processor of the access point device cause the access point device to perform one or more operations including any one or more of the steps of the methods described above.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
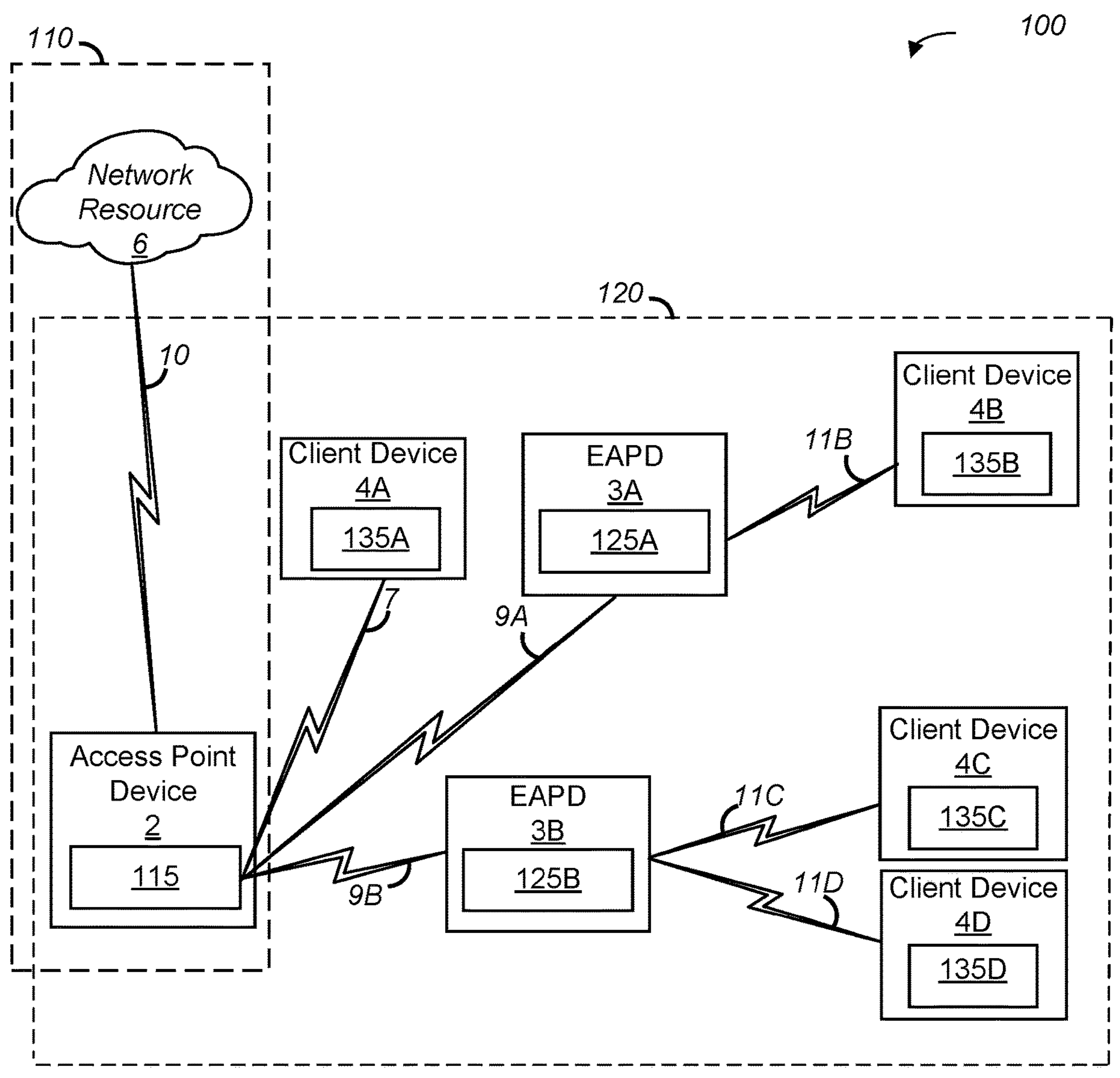
FIG. 1 is a schematic diagram of an automatic access configuration system for a network environment, according to one or more aspects of the present disclosure.

FIG. 1 is a schematic diagram of an automatic access configuration system 110 for a network environment 100, according to one or more aspects of the present disclosure. The network environment 100 can comprise a network 120 that utilizes, for example, a Wi-Fi network, a Wi-Fi mesh network, or any other Wi-Fi network to interconnect one or more devices or electronic apparatuses.

It should be appreciated that various example embodiments of inventive concepts disclosed herein are not limited to specific numbers or combinations of devices, and there may be one or multiple of some of the aforementioned devices in the system, which may itself consist of multiple communication networks and various known or future developed wireless connectivity technologies, protocols, devices, and the like.

As shown in FIG. 1, the network environment 100 includes one or more devices, such as an access point device (APD) 2 connected to a network resource 6, one or more wireless devices (for example, one or more extender access point devices (EAPD) 3A and 3B, collectively referred to as EAPD(s) 3 and/or one or more client devices 4A, 4B, 4C, and 4D, collectively or individually referred to as client device(s) 4) that may be connected in one or more wireless networks (for example, a private network, a guest network, an iControl, a backhaul network, or an Internet of things (IoT) network), any other devices, or any combination thereof. One or more devices could be located in more than one network. For example, the wireless extender access point devices 3 could be located both in a private network for providing content and information to a client device 4 and also included in a backhaul network or an iControl network.

Figure 5:
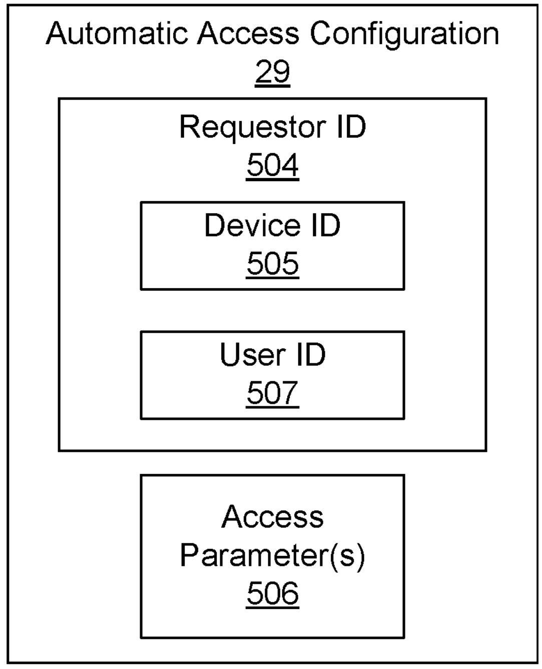
FIG. 5 is a diagram illustrating an automatic access configuration, according to one or more aspects of the present disclosure.

An automatic access configuration system 110 can comprise an access point device 2, a network resource 6, or both for providing network access to one or more devices based on an automatic access configuration 29, for example, as discussed with references to FIG. 5. The network resource 6 can comprise any of an Internet Service Provider, the Internet, a repository, a web page, a server, such as a database server, a network service, an application programming interface (API), any other network resource, a software or an application, or any combination thereof. The access point device 2 can be, for example, a hardware electronic device that may be a combination modem and network gateway device that combines the functions of a modem, an access point (AP), a gateway, a residential gateway (RG), a broadband access gateway, a home network gateway, a router, a home router, an extender access point device 3, any other devices that comprises a controller 26 as discussed with reference to FIG. 2 (including, but not limited to, a home network controller (HNC)), or any combination thereof. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 can include one or more wireless interfaces, including but not limited to, one or more radios 115 such as a 2.4 gigahertz (GHz) radio, a 5 GHz radio, a 6 GHz radio, a 60 GHz radio, any other radio, or any combination thereof. While FIG. 1 illustrates network resource 6 and access point device 2 as separate devices, the present disclosures contemplates that the network resource 6 and the access point device 2 can be a single device or a plurality of devices.

The connection 7 and connections 9A and 9B (collectively referred to as connection(s) 9), and 10 between the access point device 2, the network resource 6, the one or more extender access point devices 3, and the one or more client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. The connections 7 and 9 can also be implemented through a wide area network (WAN), a local area network (LAN), a virtual private network (VPN), a metropolitan area network (MAN), a personal area network (PAN), a wireless LAN (WLAN), a storage area network (SAN), a data over cable service interface specifications (DOCSIS) network, a fiber optics network (e.g., FTTH, FTTX, or HFC), a public switched data network (PSDN), a global Telex network, or a 2G, 3G, 4G, 5G, etc. network, for example. Additionally, any one or more connections can be implemented using a wireless connection that operates in accordance with, but is not limited to, RF4CE protocol, ZigBee protocol, Z-Wave protocol, or IEEE 802.15.4 protocol. It is also contemplated by the present disclosure that any one or more connections can include connections to a media over coax (MoCA) network or a wired connection (such as Ethernet, cable, fiber optic, or the like).

The network 120 can include one or more extender access point devices 3, for example, extender access point devices (EAPD) 3A and EAPD 3B, collectively referred to as EAPD 3. An extender access point device 3 can comprise one or more radios 125, for example, a 2.4 GHz radio, a 5 GHz radio, a 6 GHz radio, a 60 GHz radio, any other radio, or any combination thereof. The one or more extender access point devices 3 can be, for example, hardware electronic devices such as access points used to extend the wireless network by receiving the signals transmitted by the access point device 2 and rebroadcasting the signals to, for example, one or more client devices 4, which may be out of range of the access point device 2. The one or more extender access point devices 3 can also receive signals from the one or more client devices 4 and rebroadcast the signals to the access point device 2 and/or other client devices 4.

The connections 11B, 11C and 11D (collectively referred to as connection(s) 11) between respective extender access point devices 3A and 3B and respective one or more client devices 4B, 4C, and 4D, is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of these connections can also be a wired connection (such as Ethernet, cable, fiber optic, or the like).

The network 120 can include one or more client devices 4, for example, client devices 4A, 4B, 4C, and 4D that each include a radio 135A, 135B, 135C, and 135D (collectively referred to as radio(s) 135), respectively. The radios 135 can include any of a 2.4 GHz radio, a 5 GHz radio, a 6 GHz radio, a 60 GHz radio, any other radio, or any combination thereof. Any one or more of the client devices 4 can be any type of network device, for example, a hand-held computing device, a laptop computer, a personal computer, an electronic tablet, a smart phone, a smart speaker, an Internet-of-Things (IoT) device, an iControl device, a portable music player with smart capabilities capable of connecting to the Internet, cellular networks, and interconnecting with other devices via Wi-Fi and Bluetooth, or any other wireless portable or mobile consumer electronic device capable connecting to a network via an access point device 2, extender access point device 3, or both.

Figure 2:
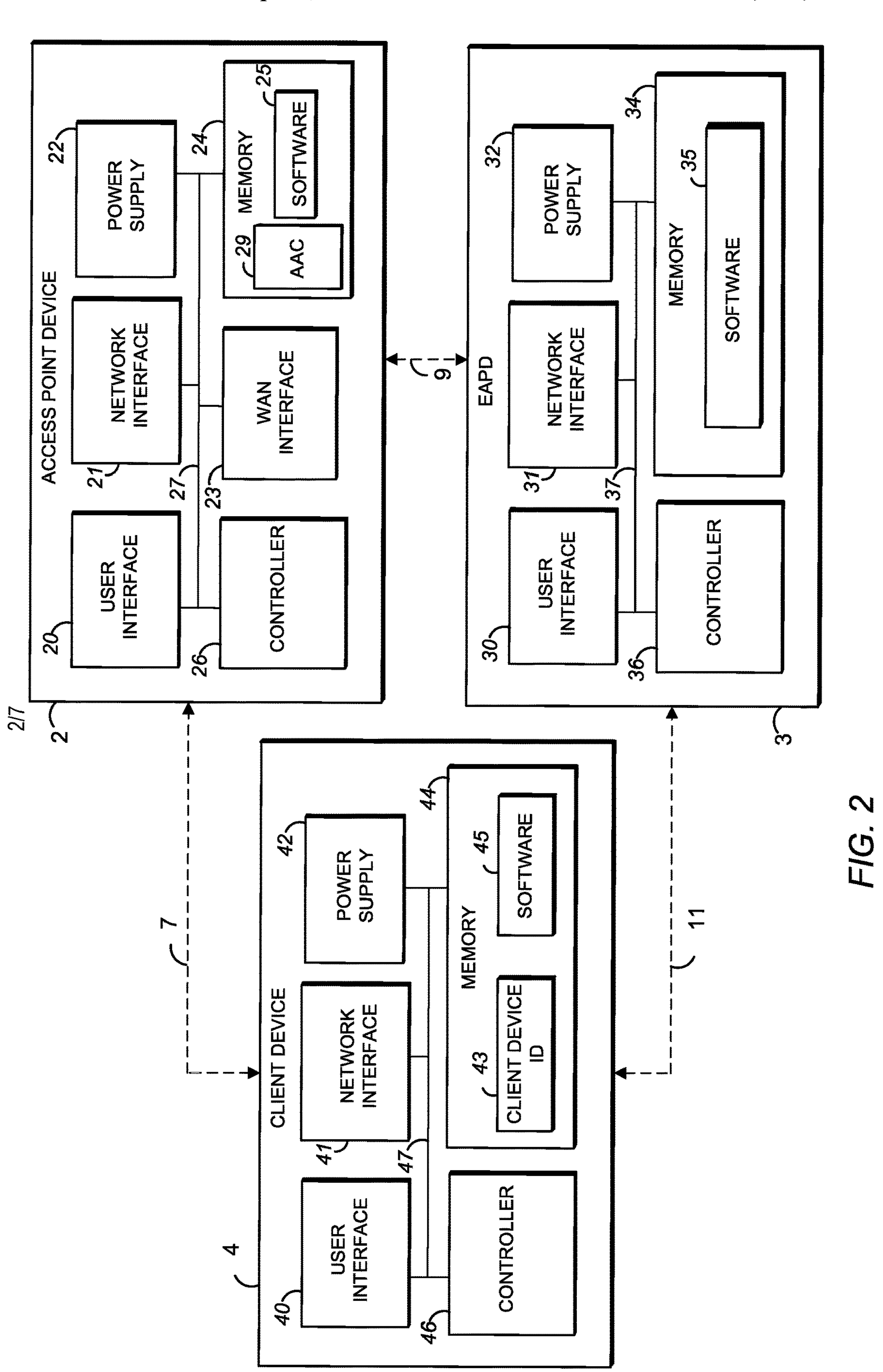
FIG. 2 is a more detailed block diagram illustrating various client devices of a network environment of FIG. 1, according to one or more aspects of the present disclosure.

A more detailed description of the exemplary internal components of the gateway device 2, the extender access point device 3, and the client devices 4 shown in FIG. 1 will be provided in the discussion of FIG. 2. However, in general, it is contemplated by the present disclosure that the devices (such as the network resource 6, the access point device 2, the extender access point device 3, and the client devices 4) can include any number of devices and can include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the access point device 2, the extender access point devices 3, and the client devices 4, may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other devices over the one or more network connections to local and wide area networks, wireless and wired networks, public and private networks, and any other communication network enabling communication in the system.

FIG. 2 is a more detailed block diagram illustrating various components of a network environment, according to one or more aspects of the present disclosure.

Although FIG. 2 only shows one access point device 2, one extender access point device 3, and one client device 4, the access point device 2, the extender access point device 3, and the client device 4 shown in the figure are meant to be representative of any number of other extender access point device 3 and client devices 4. Similarly, the connections 7, 9, and 11 between the access point device 2, the wireless extender 3, and the client device 4 shown in FIG. 2 are meant to be exemplary connections and are not meant to indicate all possible connections between the gateway devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (for example, from left to right), the client device 4 includes a user interface 40, a network interface 41, a power supply 42, a memory 44, and a local controller 46. The user interface 40 includes, but is not limited to, any of push buttons, a keyboard, a keypad, a liquid crystal display (LCD), a thin film transistor (TFT), a light-emitting diode (LED), a high definition (HD) or other similar display device including a display device having touch screen capabilities to allow interaction between a user and the client device 4, any other input/output (I/O) device, or any combination thereof. The network interface 41 can include, but is not limited to, various network cards, interfaces, and circuitry implemented in software and/or hardware to enable communications with the access point device 2 and the extender access point device 3 using the communication protocols in accordance with connections 7 and 11 (for example, as described with reference to FIG. 1). The network interface 41 can include multiple radios or sets of radios (for example, a 2.4 GHz radio, a 5 GHz radio, a 6 GHz radio, a 60 GHz radio, any other radio, or any combination thereof), which may also be referred to as wireless local area network (WLAN) interfaces. Any one or more of the radios or sets of radios can provide a fronthaul (FH) connection between the client device(s) 4 and an access point device 2 and/or an extender access point device 3.

The power supply 42 supplies power to the internal components of the client device 4 through the internal bus 47. The power supply 42 can be a self-contained power source such as a battery pack with an interface to be powered through an electrical charger connected to an outlet (for example, either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of data including a client device identifier (ID) 43 associated with the client device 4, any type of instructions, software, or algorithms including software 45 for controlling the general function and operations of the client device 4 in accordance with the embodiments described in the present disclosure, or both. The client device ID 43 can comprise any type of user identifier and/or device identifier, such as any of an inventory tracking ID, such as any of a barcode, a quality resource (QR) code, a manufacturer ID, an electronic mail (e-mail) address, an employee ID, a telephone or cellular number, any other identifier associated with a user 302 and/or a client device 4, or any combination thereof. In one or more embodiments, the client device ID 43 corresponds to a device ID 505, a user ID 507, or both of an automatic access configuration 29 as discussed with reference to FIG. 5, for example, a user identifier of the client device ID 43 can correspond to the user ID 507 and a device identifier can correspond to a device ID 505. The client device identifier 43 can be a unique identifier (for example, that distinctly identifies a device, such as a client device 4, and/or user), a group identifier (for example, that distinctly identifies a group of devices and/or a group of users), an identifier associated with the network, any other identifier that can be used by the access point device 2 to determine that a user and/or client device 4 is associated with an automatic access configuration 29, or any combination thereof.

The local controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (for example, 40, 41, 42, 44, 46) of the client device 4 may be established using an internal bus 47.

The extender access point device 3 can be, for example, a hardware electronic device such as an access point used to extend a wireless network by receiving the signals transmitted by the access point device 2 and rebroadcasting the signals to client devices 4, which may be out of range of the access point device 2. The extender access point device 3 can also receive signals from the client devices 4 and rebroadcast the signals to the access point device 2 and/or other client devices 4.

As shown in FIG. 2, the extender access point device 3 includes a user interface 30, a network interface 31, a power supply 32, a memory 34, and a local controller 36. The user interface 30 can include, but is not limited to, push buttons, a keyboard, a keypad, an LCD, a TFT, an LED, an HD or other similar display device including a display device having touch screen capabilities so as to allow interaction between a user and the wireless extender 3. The network interface 31 can include various network cards, interfaces, and circuitry implemented in software and/or hardware to enable communications with the client device 4 and the access point device 2 using the communication protocols in accordance with connections 9 and 11 (for example, as described with reference to FIG. 1). For example, the network interface 31 can include multiple radios 125 or sets of radios 125 (for example, a 2.4 GHz radio, a 5 GHz radio, a 6 GHz radio, a 60 GHz radio, any other radio, or any combination thereof), which may also be referred to as wireless local area network (WLAN) interfaces. One radio or set of radios provides a backhaul (BH) connection between the extender access point device 3 and the access point device 2, and optionally other extender access point device(s) 3. Another radio or set of radios provides a fronthaul (FH) connection between the extender access point device 3 and one or more client device(s) 4.

The power supply 32 supplies power to the internal components of the wireless extender 3 through the internal bus 37. The power supply 32 can be connected to an electrical outlet (for example, either directly or by way of another device) via a cable or wire. The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 34 can be used to store any type of instructions, software, or algorithm including software 35 associated with controlling the general functions and operations of the extender access point device 3 in accordance with the embodiments described in the present disclosure.

The local controller 36 controls the general operations of the extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the extender access point device 3 in accordance with the embodiments described in the present disclosure. General communication between the components (for example, 30, 31, 32, 34, 36) of the extender access point device 3 may be established using the internal bus 37.

The access point device 2 can include a user interface 20, a network interface 21, a power supply 22, a wide area network (WAN) interface 23, a memory 24, and a steering controller 26. The user interface 20 can include, but is not limited to, push buttons, a keyboard, a keypad, an LCD, a TFT, an LED, an HD or other similar display device including a display device having touch screen capabilities so as to allow interaction between a user and the gateway device 2. The network interface 21 may include various network cards, and circuitry implemented in software and/or hardware to enable communications with the extender access point device 3 and the client device 4 using the communication protocols in accordance with connections 7, 9 and/or 11 (for example, as described with reference to FIG. 1). For example, the network interface 21 can include an Ethernet port (also referred to as a LAN interface) and multiple radios 115 or sets of radios 115 (for example, a 2.4 GHz radio, a 5 GHz radio, a 6 GHz radio, a 60 GHz radio, any other radio or any combination thereof also referred to as WLAN interfaces). One radio 115 or set of radios 115 can provide a wireless backhaul (BH) connection between the access point device 2 and the extender access point device(s) 3. Another radio or set of radios can provide a fronthaul (FH) connection between the access point device 2 and one or more client device(s) 4.

The power supply 22 supplies power to the internal components of the access point device 2 through the internal bus 27. The power supply 22 can be connected to an electrical outlet (for example, either directly or by way of another device) via a cable or wire. The WAN interface 23 may include various network cards, and circuitry implemented in software and/or hardware to enable communications between the access point device 2 and the network resource 6 using the wired and/or wireless protocols in accordance with connection 10 (for example, as described with reference to FIG. 1). For example, the WAN interface 23 can include an Ethernet port and one or more radios (for example, a 6 GHz radio). The WAN interface 23 (for example, a 6 GHz radio) may be used to provide a wireless backhaul (BH) connection between the access point device 2 and any one or more other elements, according to example embodiments of the present disclosure. However, the WAN interface 23 could provide a wired Ethernet connection (for example, a BH connection) between the access point device 2 and any other element according to some alternative example embodiments.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the access point device 2 and performing automatic access to one or more client devices to the network in accordance with the embodiments described in the present disclosure. The memory 24 can store one or more an automatic access configuration (AAC) 29 that stores information associated with providing one or more client devices automatic access to the network. The automatic access configuration 29 can be stored in memory 24 and configured using a user interface 20 or any other interface whether remote or local that allows for configuration of the automatic access configuration 29. The automatic access configuration 29 can be stored locally at the access point device 2 or remotely, for example, at a network resource 6 and then accessed at and/or download from the network resource 6 as needed.

The controller 26 controls the general operations of the access point device 2 as well as performs automatic access configuration functions related to one or more client devices (for example, extender access point device 3 and client device 4) in the network. The controller 26 may also be referred to as a HNC. The controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure. Communication between the components (for example, 20, 21, 22, 23, 24, 26) of the access point device 2 may be established using the internal bus 27. The controller 26 may also be referred to as a processor, generally.

Figure 3:
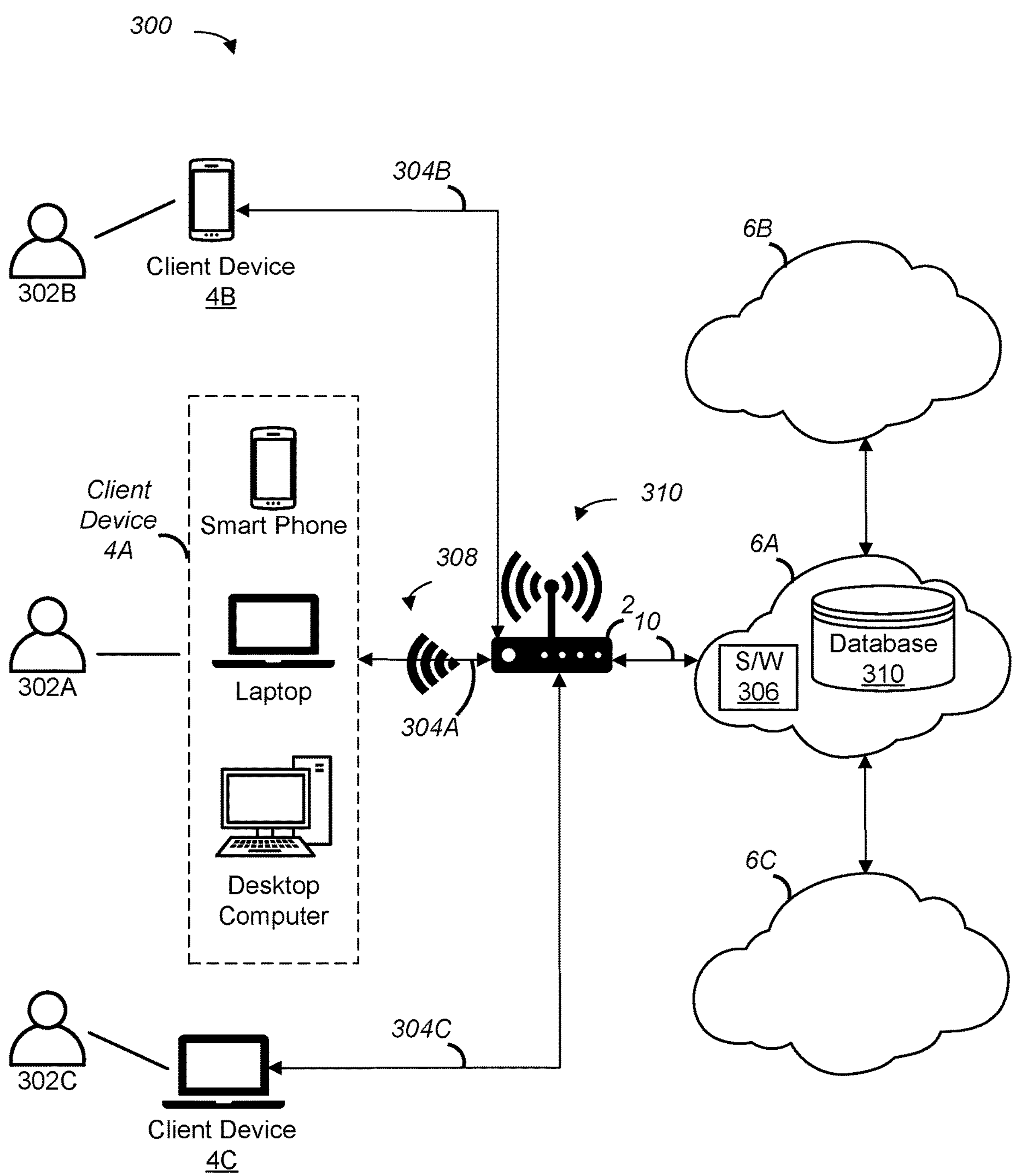
FIG. 3 is a diagram illustrating a network environment that includes an access point device providing a client device access to a network, according to one or more aspects of the present disclosure.

FIG. 3 is a diagram illustrating network environment 300 that includes an access point device 2 providing a client device, for example, a client device 4, access to a network 310, according to one or more aspects of the present disclosure. For example, providing automatic access to a Wi-Fi network for well-known or authorized requestors, such as a well-know or authorized client device 4 or user associated with a client device 4.

The access point device 2 can provide a network 310, such as a Wi-Fi network, within a premises or a site. The access point device 2 can be connected to a network resource 6 via a connection 10. For example, one or more network resources 6A, 6B, and 6C (collectively referred to as network resource(s) 6) can be accessible by the access point device 2. Network resource 6A can be a cloud server that stores an automatic access configuration 29, stores and/or makes accessible one or more automatic access configuration parameters of an automatic access configuration 29, including, but not limited to downloading and storing one or more SSIDs associated with one or more networks, otherwise collects and/or stores information associated with any of a client device 4, a user 302, any other network device, or any combination thereof associated with the network environment 300 and/or the network 310. The network resource 6A can comprise a database 310 or any other storage medium for storing the automatic access configuration 29. The network resource 6A can comprise software 306 for configuring the automatic access configuration 29 and one or more functions to the access point device 2 related to the automatic access configuration 29. For example, the network resource 6A can communicate with a cloud server 6B to obtain contact or identifier information associated with a user 302 and/or a network device (such as client device 4), an MSO server 6C to obtain MSO specific contact or identifier information, or both. While FIG. 3 illustrates different network resources 6A, 6B, 6C, the present disclosure contemplates that 6A, 6B, and 6C can be included within or as part of a single network resource 6 or a plurality of network resources 6. In one or more embodiments, the network resource 6A will store the network SSID and network password for each access point device 2 associated with one or more networks and/or one or more network environments.

A network resource 6 can comprise a network resources application, such as software, that includes one or more computer-readable instructions stored in a memory, similar to or the same as software 45 and memory 25 discussed with reference to FIG. 2, that can provide one or more network resources features. For example, the network resources application can comprise a portal feature that supports or allows any of processing, configuration, modification, alteration, creation, otherwise handling, or any combination thereof of one or more automatic access configuration parameters associated with an automatic access configuration 29, a network resources interface feature that provides or otherwise pushes any of one or more automatic access configuration parameters associated with an automatic access configuration 29 including, but not limited to, pushing one or more SSIDs to each access point device 2 associated with a network and/or a network environment, for example, that are used as part of a Wi-Fi mesh network.

The access point device 2 can be connected to one or more client devices 4A, 4B, and 4C associated with one or more users 302A, 302B, and 302C, respectively, via one or more connections 304A, 304B, and 304C, respectively, where connections 304A, 2304B, and 304C can be any associated connection discussed with reference to FIG. 1. The one or more client devices 4A can communicate with an access point device 2 via a requestor access point connection 308. The requestor access point connection 308 allows for secure communications between the access point 2 and the one or more client devices 4A prior to the one or more client devices 4A being provided access to the network 310.

The access point device 2 can comprise a controller application, such as software 25, that includes one or more computer-readable instructions stored in a memory, such as a memory 24, that can provide one or more controller application features configured to provide automatic access to a network for a client device 4. For example, the controller application can comprise a network resource interface feature that allows the access point device 2 to communicate with a network resource 6 so as to obtain and/or query for one or more requestor identifiers, one or more valid SSIDs (for example, so as to filter out neighboring SSIDs or to validate a received SSID as part of one or more received automatic access configuration parameters), a connection feature that provides support for a requestor access point connection, such as a low data rate Wi-Fi messaging connection between the access point device 2 and a client device 4 (for example, for customized probe request messages), security for a requestor access point connection, or both, an access network feature that provides any of support, processing, generation, configuration, alteration, creation, modification, storing, any other handling, or any combination thereof of any of one or more automatic access configuration parameters associated with an automatic access configuration 29, a probe request message, a probe response message, a key exchange, an access parameter request, an access parameter response, a disassociation message, information from a network resource 6, or any combination thereof.

The user 302A can be associated with one or more client devices 4A and can be any of an administrator, a super user, an owner, any other user, or any combination thereof, associated with one or more privileges for configuring (such as any of modifying, updating, changing, altering, creating, deleting, otherwise managing, or any combination thereof) an automatic access configuration 29 associated with the network 310. The user 302A can be an authorized consumer (such as a head of household) or a system administrator of a business. The one or more client devices 4A can comprise a requestor application, such as a software 45, for providing one or more features so as to provide one or more client devices 4 automatic access to a network 410. The user 302A can customize a list of contacts or define a list of employees that are allowed to automatically access the network 310 using one or more access parameters (such as one or more network credentials and/or other information) associated with the business and/or the network 310. As an example, a user 302A can have a list, such as a mobile contact list or a company contact list, stored on and/or otherwise retrievable by client device 4A. One or more contacts or entries in the list can be uploaded or otherwise input to an automatic access configuration 29 at the access point device 2, the network resource 6, or both. For example, a company can utilize a company cloud configuration so that the automatic access configuration 29 can comprise one or more Wi-Fi credentials associated with multiple business sites or locations. A network resource 6 associated with each of the business sites or locations can be interconnected via a common corporate network so that the automatic access configuration 29 can be updated from any business site or location which allows a user to transition a client device 4 across multiple sites or locations and still automatically connect to the corporate network. In one or more embodiments, a user 302A can provide one or more other users 302 a limited access to upload associated information to the automatic access configuration 29 so as to permit automatic access to the Wi-Fi network on subsequent visits. The automatic access configuration 29 can be customizable such that one or more parameters or elements can be any of created, updated, added, altered, modified, removed, otherwise changed, or any combination thereof. For example, a client device 4 can send a customization instruction to the access point device 2 that comprises one or more automatic access configuration parameters and then the access point device 2 can validate or authenticate the customization instruction and/or the client device 4 (such as, confirm that the client device 4 has permission or is otherwise authorized to perform the customization) and then perform the requested customization on the automatic access configuration 29.

The client device 4 can comprise a requestor application, such as software 45, that includes one or more computer-readable instructions stored in a memory, such as a memory 44, that can provide one or more requestor application features configured to provide automatic access to a network for a client device 4. For example, the requestor application can comprise an automatic access configuration feature that can provide a user interface feature for a user 302A to configure one or more automatic access configuration parameters of the automatic access configuration 29, an access point connection feature that provides any of support, processing, generation, configuration, alteration, creation, modification, storing, any other handling, or any combination thereof of any of a probe request message, a probe response message, a key exchange, an access parameter request, an access parameter response, a dissociation request, information from a network resource 6, or any combination thereof, a network access feature that can send an access parameter request to the access point device 2 (for example, that can include a request for a network password so as to receive validation or authorization to access a network), receive, process, otherwise handle, or any combination thereof one or more responses to an access parameter request, or both, a password feature that can provide support to automatically enter or provide network password for a client device including providing or entering a network password for each network associated with an access point device 2 when a client device traverses or transitions to one or more different locations or zones of a network (such as a Wi-Fi mesh network), a security feature that provides security for a requestor access point connection, or any combination thereof.

As an example, a user 302B and user 302C can be any of a visitor/guest, a family member, a non-resident, any other user, or any combination thereof associated with a client device 4B (such as a mobile telephone or cellular device) and a client device 4C (such as a laptop), respectively. The users 302B and 302C can be registered or otherwise configured by the user 302A to be included in or as part of an automatic access configuration 29 associated with the network 310, for example, a home network. When the users 302B and 302C come within proximity of the home network, the access point device 2 automatically provides the client devices 4B and 4C any necessary access parameters, such as one or more network credentials, and/or authorization required to access the home network without requiring the respective users 302B and 302C to perform any manual steps or functions based on the automatic access configuration 29.

As another example, user 302B and user 302C can be one or more employees of a business that routinely need access to the network 310, such as a secured business network and/or a Wi-Fi mesh network. The user 302A can register or otherwise configure an automatic access configuration to include information associated with any of a user 302B, a user 302C, a client device 4B associated with the user 302B, a client device 4C associated with the user 302C, or any combination thereof. When the employees 302B and 302C come within proximity of the secure business network, the access point device 2 automatically provides the client devices 4B and 4C one or more access parameters, such as one or more network credentials, and/or authorization, required to access the secure business network without requiring the respective employees 302B and 302C to perform any one or more manual steps or one or more manual functions. In one or more embodiments, the automatic access configuration can be utilized across a plurality of networks. For example, a user 302A can configure an automatic access configuration 29 for use at a primary residence, a vacation residence, a primary office, a satellite office, any other location, or any combination thereof.

As another example, a plurality of SSIDs can be found when a requestor (such as a client device 4) transitions to a location within proximity of the network 310. For example, the client device 4 can establish communications over the requestor access point connection associated with the access point device 2 as discussed, for example, with respect to FIG. 6. One or more first SSIDs can be associated with a customer's premises and one or more second SSIDs can be associated with a neighboring or nearby location. To prevent attempts to access unintended networks, for example, networks associated with the one or more second SSIDs, a requestor SSID is validated or verified. For example, the client device 4, such as software 45 running on client device 4, can receive an SSID in a probe response message 400 from a device within proximity of the client device 4. The client device 4 (for example, software 45) can send a message (for example, a validate Wi-Fi SSID request message that comprises information, such as one or more automatic access configuration parameters to authorize access) to the access point device 2 (for example, software 25) over the requestor access point connection 308 to verify or validate that the SSID is a valid SSID associated with the location of the network 310 (for example, based on a comparison of the SSID to one or more automatic access configuration parameters, and not an SSID associated with a different network, such as a neighboring or adjacent Wi-Fi network. For example, the access point device 2 can receive a list of valid SSIDs from a network resource 6 (for example, received as a result of a query or other request for one or more automatic access configuration parameters from an access point device 2, a network resource 6, or both) and compare the requestor SSID received from the client device 4 as part of a Wi-Fi SSID request message to the list of previously received valid SSIDs, send a query to a database 310 at a network resource 6 for confirmation that the received requestor SSID is valid, or both. If the access point device 2 determines that the requestor SSID is valid, the access point device 2 can provide for automatic authorization of a client device 4 so that one or more access parameters can be sent to the client device 4. The client device 4 can then use the one or more access parameters to access the Wi-Fi network. For example, the access point device 2 can establish a requestor access point connection with the requestor (such as a client device 4) and send one or more access parameters, such as one or more Wi-Fi credentials, over the requestor access point connection so that the requestor can use the one or more access parameters to connect to the Wi-Fi network.

To provide automatic authorization for one or more client devices 4 to receive one or more access parameters to access a Wi-Fi network via any one or more access point devices 2 within a network environment 300, the network resource 6 can store the one or more access parameters associated with each access point device 2, such as the network SSID and the network password associated with each access point device 2, for each network environment 300. Once a client device 4 is authorized or otherwise provided access to a network 310, the network resource 6 can send the one or more access parameters, such as the one or more network passwords associated with each network SSID, for each access point device 2 to the client device 4 directly or indirectly via the access point device 2. Providing the client device 4 with the one or more access parameters associated with each network SSID for each access point device 2 avoids or mitigates the requirement for a client device 4 to request a plurality of approvals or authorization when the client device 4 (or requestor) transitions throughout the network environment 300. Once the one or more access parameters associated with each of the plurality of access point devices are resident or otherwise stored on the client device 4, the client device 4 (for example, via software 45) can provide a user interface to a user that allows selection of a first access point device 2 of the plurality of access point devices to use when a plurality of access point devices are available for connection. In one or more embodiments, the client device 4 can automatically select a second (or subsequent) access point device 2 (associated with a second SSID) of the plurality of access point devices when the first SSID is no longer in range so that the client device 4 can automatically connect to the second access point device 2.

Figure 4:
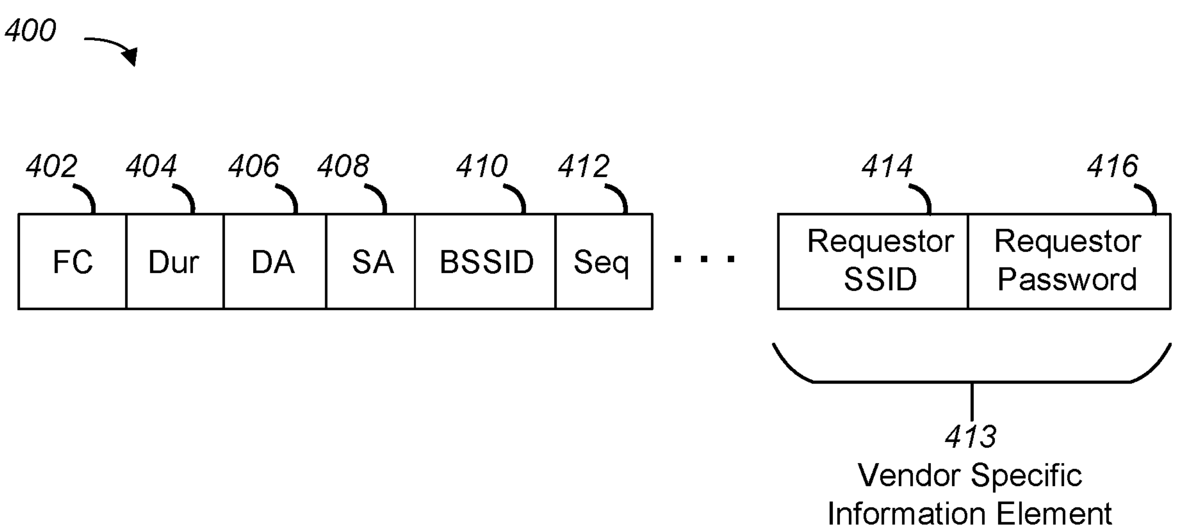
FIG. 4 is a diagram illustrating a probe response message, according to one or more aspects of the present disclosure.

FIG. 4 is a diagram illustrating a probe response message 400, according to one or more aspects of the present disclosure. A probe response message 400 can be communicated or sent from an access point device 2 to one or more client devices 4 so that the one or more client devices 4 can communicate with the access point device 2 via a requestor access point connection of the access point device 2. The probe response message 400 can comprise a plurality of fields including, but not limited to any of a frame control (FC) 402, a duration (Dur) 404, a destination address (DA) 406, a source address 408, a basic service set identifier (BSSID) 410, a sequence control (Seq) 412, a vendor specific information element 413, any other field, or any combination thereof. The vendor specific information element 413 can comprise one or more parameters for accessing a requestor access point connection, such as a requestor SSID 414 and a requestor password 416. The vendor specific information element 413 can be parsed or extracted from the probe response message 400 by a client device 4 so as to allow the client device to access the requestor access point connection. For example, a client device 4 can receive a probe response message 400 from an access point device 2 when the client device is transitioned within proximity of the access point device 2 of a network. The client device 4 can extract the vendor specific information element 413 from the probe response message 400 and use the information in the vendor specific information element 413 to connect to the access point device 2 via the requestor access point connection. In this way, the client device 4 can be automatically authorized or authenticated and thus receive the required one or more access parameters required to access the network.

FIG. 5 is a diagram illustrating an automatic access configuration 29, according to one or more aspects of the present disclosure. The automatic access configuration 29 can comprise one or more automatic access configuration parameters, such as any of a requestor identifier (ID) 504, one or more access parameters 506, or both. The requestor ID 504 can comprise a device ID 505, a user ID 507, any other identifier associated with a user 302, a client device 4, any other network device, or any combination thereof. The device ID 505 can comprise an inventory tracking ID, such as any of a barcode, a quality resource (QR) code, a manufacturer ID, any other identifier, or any combination thereof. The user ID 507 can comprise any of an electronic mail (e-mail) address, an employee ID, a telephone or cellular number, any other identifier associated with a user 302, or any combination thereof. In one or more embodiments, the device ID 505, the user ID 507, or both can be unique identifiers (for example, that distinctly identifies a client device and/or user), a group identifier (for example, that distinctly identifiers a group of client devices and/or a group of users), an identifier associated with the network, any other identifier that can be used by the access point device 2 to determine that a user and/or client device 4 is associated with an automatic access configuration 29, or any combination thereof. The one or more access parameters 506 can comprise any of a private and/or public network identifier, a duration associated with a connection, a radio band, a date (such as one or more identifiers associated with one or more days of week that access is permitted), a time (such as a range or interval of time that access is permitted), any other parameter associated with connection and/or access to the network, or any combination thereof.

In one or more embodiments, a network resource 6 and/or an access point device 2 can include software, such as any of a portal, a user interface (for example, any of a graphical user interface (GUI), a command line interface (CLI), an API, any other interface, or any combination thereof), an application, any other software that allows for inputting or loading of information (such as one or more automatic access configuration parameters and/or a user input), or any combination thereof that allows for configuration of the automatic access configuration 29. As an example, the automatic access configuration 29 can be configured locally, remotely, directly, and/or indirectly via any of an access point device 2, a network resource 6, a client device 4, or any combination thereof, such as via software, for example, an application or a portal. For example, a user can access software 25 at an access point device 2 that allows for direct configuration of the automatic access configuration 29 at the access point device 2, indirect configuration of the automatic access configuration 29 at a network resource 6 and/or any other authorized client device 4, or any combination thereof. As another example, the automatic access configuration 29 at a network resource 6 can be configured directly via the software that is accessible via a client device 4 using one or more access parameters.

In one or more embodiments, the automatic access configuration 29 is customizable such that a bulk update of one or more automatic access configuration parameters or elements can be performed. For example, any of bulk changes, additions, modification, creations, alterations, or any combination thereof associated with one or more requestor identifiers 504 and/or access parameters 506 can be made, such as any of update to an electronic mail (email) address (such as an email address associated with a family or a business), a uniform resource locator (URL), a password, any other information, or any combination thereof. By providing a customizable automatic access configuration 29, one or more access parameters 506, such as a password, can be changed without requiring the user to manually perform any functions as an associated client device will automatically be authorized to access the network and provided the necessary one or more access parameters 506 so as to access the network.

Figure 6:
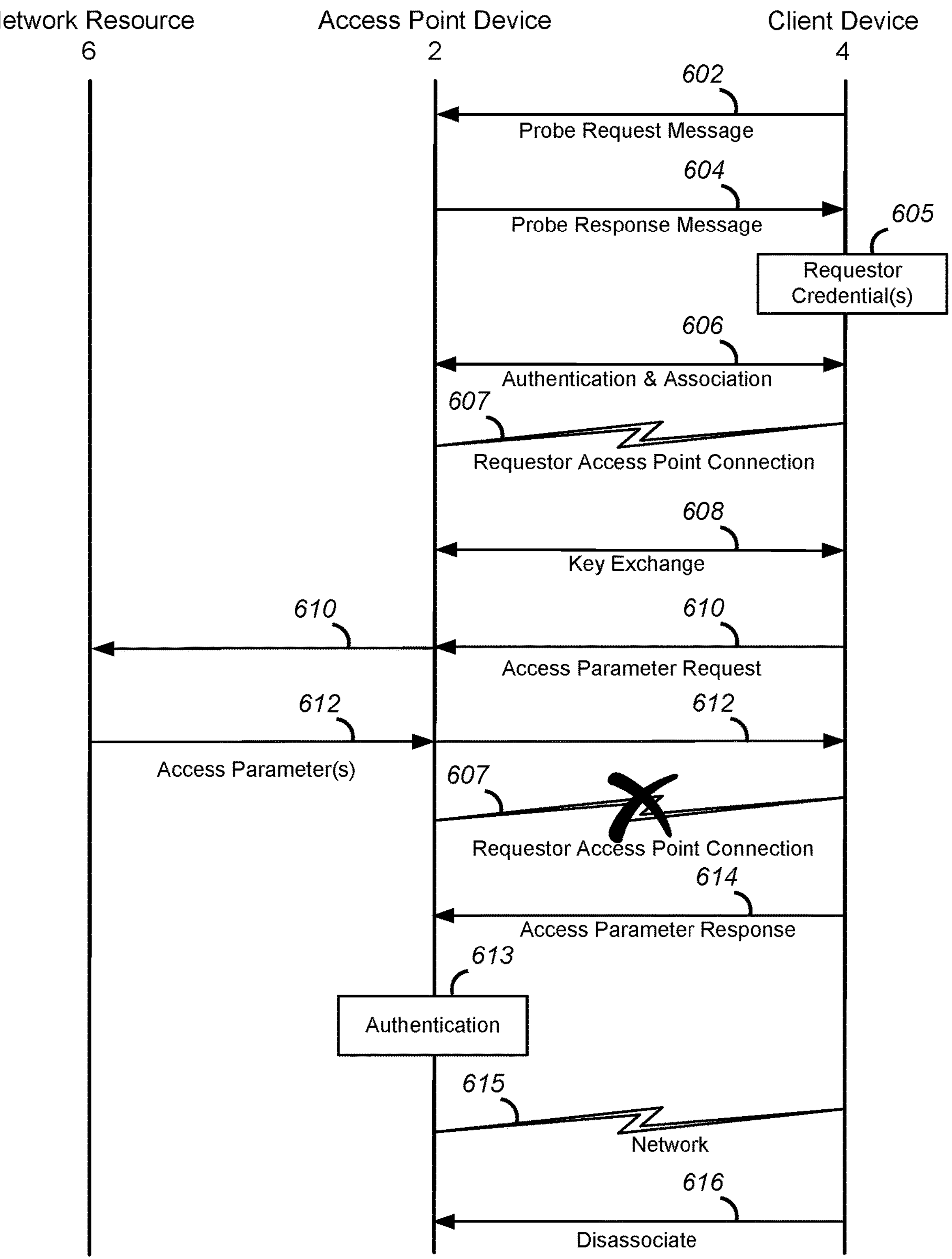
FIG. 6 is a flow diagram illustrating providing a client device access to a network based on an automatic access configuration, according to one or more aspects of the present disclosure.

FIG. 6 is a flow diagram illustrating providing a client device, such as a client device 4, access to a network based on an automatic access configuration 29, according to one or more aspects of the present disclosure. When a Wi-Fi requestor, referred to in this example as a client device 4, is transitioned to within proximity of an access point device 2, the client device 4 may not be able to communicate with the access point device 2. However, a requestor access point connection of the access point device 2 allows for an initial communication between the client device 4 and an access point 2 without having to provide the client device 4 access to a network (such as full Wi-Fi access, Internet access, or both) associated with the access point device 2. The access point device 2 and the client device 4 include support for sending and receiving communications, for example, one or more messages, via the requestor access point connection. The requestor access point connection allows client device 4 to send and/or receive messages related to any of an authorization, an authentication, one or more access parameters, or any combination thereof prior to the access point device 2 allowing the client device 4 access to the Wi-Fi network. The requestor access point connection can provide low data rate support as well as provide secured communications (for example, encrypted communications) such that messages (or communications) can be securely sent to and/or received from a client device 4. The access point device 2 does not provide support for Internet connectivity via this requestor access point connection and as such the requestor access point connection is not a traditional network, Wi-Fi connection, and/or hotspot connection. Rather, the requestor access point connection supports one or more messages (or communications), such as any of the messages associated with a probe request message 602, a probe response message 604, one or more access parameters, or any combination thereof.

As illustrated in FIG. 6, a client device 4 can send a probe request message 602 to the access point device 2. Prior to sending the probe request message 602, the client device 4 is configured with an identifier, such as a client device identifier 43 that corresponds to a requestor ID 504 as discussed with reference to FIG. 5. In response to the probe request message 602, the access point device 2 sends the client device 4 a probe response message 604 that comprises one or more requestor credentials 605 for the client device 4 to use for establishing the requestor access point connection, such as a vendor specific information element 413 of a probe response message 400 as discussed with reference to FIG. 4. Client device 4 can parse the probe response message 604 for one or more requestor credentials 605, for example, extract from a probe response message 400 the vendor specific information element 413, such as the requestor SSID 414, the requestor password 416, or both.

A requestor access point connection 607 can be established based on the one or more requestor credentials 605, for example, the vendor specific information element 413. The requestor access point connection 607 can be the same as or similar to the requestor access point connection 308 as discussed with reference to FIG. 3. As an example, the client device 4 and the access point device 2 can exchange authentication and association information 606, such as the client device 4 can send the one or more requestor credentials 605, such as the requestor SSID 414, the requestor password 416, or both, parsed from the probe response message 604, as part of an authentication and association with the access point device 2 so as to establish the requestor access point connection 607. After the requestor access point connection 607 is established, the client device 4 can securely exchange communications with the access point device 2 via the requestor access point connection.

In one or more embodiments, the client device 4 can send to the access point device 2 one or more requestor credentials that were previously stored at the client device 4 in lieu of the probe request message 602. As an example, client device 4 can be configured with one or more requestor credentials 605, such as a requestor SSID 414, a requestor password 416, or both. For example, the client device 4 can store a client device ID 43, the one or more requestor credentials 605, or both in a memory 44. When the client device 4 is transitioned within proximity of the access point device 2, the client device 4 can send any one or more of the stored one or more requestor credentials 605, such as the requestor SSID 414, the requestor password 416, or both, to the access point device 2 as part of the authentication and association 606 so as to access, connect, or otherwise establish a requestor access point connection 607 associated with the access point device 2.

After access point device 2 and the client device 4 are communicatively coupled via the requestor access point connection 607, a key exchange 608 occurs between the access point device 2 and the client device 4 to ensure a secure connection is established. For example, the key exchange 608 can be used for authentication of secure message communications, such as authentication of one or more client devices 4 prior to establishing a secure message connection.

The client device 4 can send an access parameter request 610 to the access point device 2, such as a Wi-Fi SSID request message, for one or more access parameters required for access to the network associated with the access point device 2 via the requestor access point connection 607. The access parameter request 610 can comprise information associated with the client device 4, for example, a client device identifier 43 can be compared to a requestor ID 504 of an automatic access configuration parameter 29 (such as a user identifier of the client device identifier 43 can be compared to a user ID 507, a device identifier of the client device identifier 43 can be compared to a device ID 505, or both). In one or more embodiments, the access point device 2 can receive the access parameter request 610 and send or forward the access parameter request 610 to a network resource 6.

The network resource 6, the access point device 2, or both can determine, based on the access parameter request 610 to provide the client device 4 one or more access parameters 612. The access parameter request 610 can comprise a client device identifier 43. For example, network resource 6, the access point device 2, or both can compare the client device identifier 43 in the access parameter request 610 to one or more automatic access configuration parameters of an automatic access configuration 29, such as a user identifier of the client device identifier 43 can be compared to a user ID 505 of a requestor ID 504, a device identifier of the client device identifier 43 can be compared to a device ID 507 of a requestor ID 504, or both. Based on the comparison, access point device 2, the network resource 6, or both can authorize, provide, or otherwise send one or more access parameters 612 to the client device 4. The one or more access parameters 612 can comprise one or more network credentials, such as a network password associated with the network and/or network SSID, one or more Wi-Fi credentials, or both, information associated with the network, or any combination thereof. In one or more embodiments, the access point device 2 receives the one or more access parameters 612 from the network resource 6. For example, the network resource 6, the access point device 2, or both can compare information to an automatic access configuration, such as the client device identifier received via the access parameter request 610 can be compared to a device ID 505, a user ID 507, or both, of an automatic access configuration 29. The access point device 2 can send the one or more access parameters 612 to the client device 4 via the requestor access point connection 607. The access point device 2 can then disconnect the client device 4 from or otherwise close the requestor access point connection 607.

The client device 4 can send an access parameter response 614 that requests access to the network 615 to the access point device 2. The access parameter response 614 can comprise the one or more access parameters 612 received from the access point device 2, the network resource 6, or both. The access point device 2 can perform an authenticate 613 of the one or more access parameters 612. Based on the authentication 613, the access point device 2 can provide and/or allow or deny access to the network 615 by the client device 4. The requestor access point connection 607 can be terminated or otherwise disconnected by the access point device 2, for example, after the client device 4 has been provided/allowed or denied access to the network 615. The client device 4 can send a dissociation message 616 to the access point device 2 so as to disassociate from the access point device 2 when access to the network 615 is no longer required.

Figure 7:
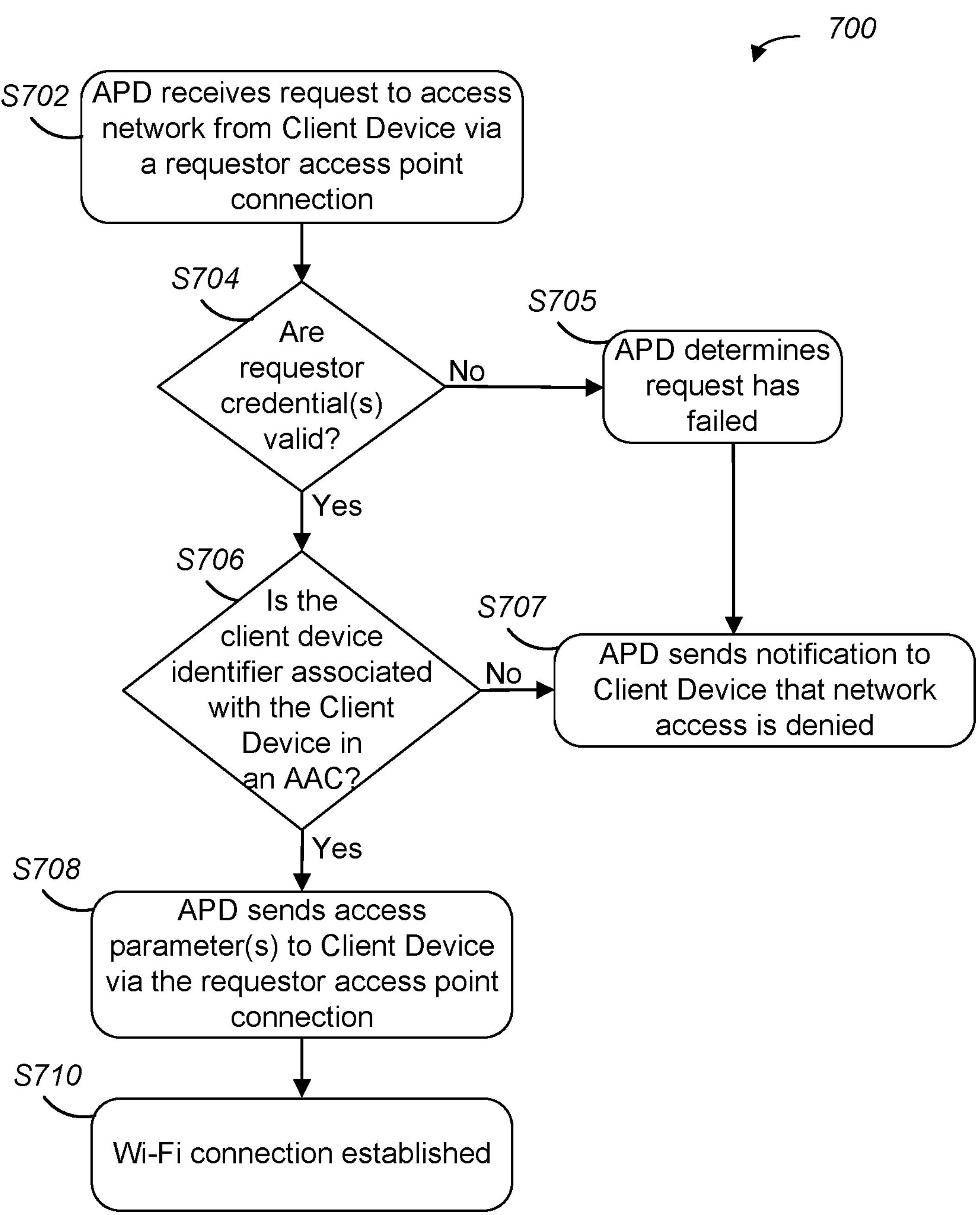
FIG. 7 is a flow chart illustrating a method for automatically providing to a client device one or more access parameters so as to provide the client device access to a Wi-Fi network, according to one or more aspects of the present disclosure.

FIG. 7 is a flow chart illustrating a method or process 700 for automatically providing to a client device, such as a client device 4, one or more access parameters so as to provide the client device access to a Wi-Fi network, according to one or more aspects of the present disclosure. In one or more embodiments, an access point device 2 may include a controller 26, such as a device controller or HNC, that may be programmed with or to execute one or more instructions (for example, software or application 25) to perform steps for providing to a client device access to a Wi-Fi network associated with the access point device 2. In FIG. 7, it is assumed that all devices include their respective controllers and their respective software stored in their respective memories, as discussed above in reference to FIGS. 1-6, which when executed by their respective controllers perform the functions and operations in accordance with the example embodiments of the present disclosure.

The controller 26 executes one or more computer-readable instructions, stored in a memory, for example, a memory 24 of an access point device 2, that when executed perform one or more of the operations of steps S702-S710. In one or more embodiments, the one or more computer-readable instructions may be one or more software applications, for example, a software 25 of an access point device 2. While the steps S702-S710 are presented in a certain order, the present disclosure contemplates that any one or more steps can be performed simultaneously, substantially simultaneously, repeatedly, in any order or not at all (omitted).

Prior to allowing or providing access to a network, an automatic access configuration 29 is configured with one or more parameters or elements as discussed with reference to FIG. 5. For example, the automatic access configuration 29 can be stored at a network resource 6, an access point device 2, or both. The automatic access configuration 29 can be configured with one or more automatic access configuration parameters, such as a requestor identifier 504 and/or one or more access parameters 506, that are associated with one or more client devices and/or users that are allowed to have automatic access to the network.

As an example, a client device, such as a client device 4, can be brought within proximity of an access point device 2 that provides or is associated with a Wi-Fi network. The client device 4 can initiate communication with the access point device 2 via a requestor access point connection. As an example, when the client device 4 comes within proximity of the access point device 2, the client device 4 may not be connected to the access point device 2 and thus not able to communicate with the access point device 2. A requestor access point connection 308 can be provided or established by the access point device 2 such that the access point device 2 and the client device 4 can send and/or receive messages via the requestor access point connection 308 even when the client device 4 is not allowed or authorized to access the Wi-Fi network associated with the access point device 2. The requestor access point connection 308 can provide low data rate support and security such that messages can only be exchanged between the access point device 2 and the client device 4. For example, the requestor access point connection 308 allows for communications between the access point device 2 and the client device 4 without providing Internet connectivity or other Wi-Fi access to the client device 4.

At step S702, the access point device 2 receives a request to access the Wi-Fi network from the client device 4 via the requestor access point connection. The request can include one or more requestor credentials 605 associated with the client device 4. As discussed with reference to FIG. 6, the client device 4 can be configured with one or more requestor credentials 605 or can receive the one or more requestor credentials 605 from an access point device 2, a network resource 6, or both. As an example, a vendor specific information element 413 of a probe response message 400 can comprise a requestor SSID 414 and/or a requestor password 416 for the requestor access point connection 308. This requestor SSID 414 and requestor password 416 can be encrypted so that only authorized client devices 4 can decrypt the probe response message 400. To further ensure security of any communications between the client device 4 and the access point device 2 via the requestor access point connection, any messaging used can also be encrypted. For example, a client device 4 can have unique information to perform decryption and/or encryption of data in messaging from and/or to the access point device 2 that supports messaging via a requestor access point connection. As an example, a corporate, business, or enterprise network can utilize extensible authentical protocol (EAP) over LAN (EAPOL) authentication to allow a client device 4 full access to the network. As another example, a client device 4 can scan a QR at an entry point associated with the network (for example, at a reception desk or affixed to a sign) and/or on the client device 4 (for example, an email address or other message could be stored on the client device 4 which can include the QR code).

At step S704, the access point device 2 determines if the one or more requestor credentials 605 received from the client device 4 are valid. If the access point device 2 determines at step S704 that the one or more requestor credentials 605 are not valid, for example, the access point device 2 determines that the requestor SSID, the requestor password, or both do not match the SSID, the password, or both, respectively, required for the requestor access point connection, then at step S705 the access point device 2 determines that the request received at step S702 has failed. The client device 4 is not permitted to connect or is not provided access to the requestor access point connection and the process continues at step S707 where the access point device 2 sends a notification to the client device 4 that the request to access the network has failed. In one or more embodiments, one or more additional instructions can be sent from the access point device 2 to the client device 4 to prompt a user via a user interface 40, such as via an I/O and/or display device of the client device 4, for a manual entry of one or more access parameters associated with the network.

If the access point device 2 determines that the one or more requestor credentials 605 are valid at step S704, for example, the requestor SSID, the requestor password, or both match the SSID, the password, or both, respectively, required for the requestor access point connection, the access point device 2 at step S706 determines if a client device identifier 43 associated with the client device 4, such as a client device identifier, a client user identifier, or both, matches or has a corresponding requestor identifier 504 in an automatic access configuration 29 at the access point device 2, a network resource 6, or both. If the automatic access configuration 29 does not have a requestor identifier 504 that matches or corresponds to the client device identifier 43 associated with the client device 4, then at step S707 the access point device 2 sends a notification to the client device 4 that access to the network is denied. The notification can comprise one or more instructions requesting the client device 4 to prompt a user for manual entry of one or more access parameters via a user interface 40.

If at step S706, the access point device 2 determines that the client device identifier 43 matches one or more automatic access configuration parameters of the automatic access configuration 29, then at step S708, the access point device 2 sends one or more access parameters associated with the Wi-Fi network to the client device 4 via the requestor access point connection established after validation at step S704.

In one or more embodiments, client device 4 can send to the access point device 2 one or more access parameters that were previously stored, used, or otherwise received by the client device 4. The access point device 2 can determine if an update is required for one or more of the one or more of the access parameters, for example, any of the one or more access parameters 506 as discussed with respect to FIG. 5. If an update is required, then the access point device 2 at step 708 can send via the requestor access point connection one or more updates for the one or more of the one or more access parameters in lieu of sending all the one or more access parameters required to access the Wi-Fi network. During the operation of a network environment any of a configuration, a hardware component, a software component, a firmware component, any other setting (including, but not limited to, any of a version of any one or more components, a band, a network password, a network SSID, any other one or more access parameters 506 discussed with reference to FIG. 5, or any combination thereof), or any combination thereof can be changed, altered, or otherwise updated for any one or more devices, for example, a network environment 100 that comprises one or more devices as discussed with reference to FIG. 1, such that one or more access parameters are changed. As a result, one or more of the one or more access parameters previously used by a device to access the Wi-Fi network 120 will not be current and thus the device will not be permitted or allowed access to the Wi-Fi network 120. For example, a password associated with the Wi-Fi network can be changed routinely. When the client device 4 comes within proximity of the access point device 2, an attempt by the client device 4 to access the Wi-Fi network using the previously stored network password fails. Providing an update of the password associated with the Wi-Fi network provides the client device 4 with the appropriate one or more access parameters so as to access the Wi-Fi network.

At step S710, the access point device 2 validates or otherwise provides access to the client device 4 to the network and a Wi-Fi connection to the network is established for the client device 4 based on the access point device 2 receiving the one or more access parameters from the client device 4. In one or more embodiments, the client device 4 can attempt to connect to the Wi-Fi network without communicating with the access point device 2 via the requestor access point connection. If the attempted connection fails, client device 2 can attempt to access the Wi-Fi network via the process 700.

Figure 8:
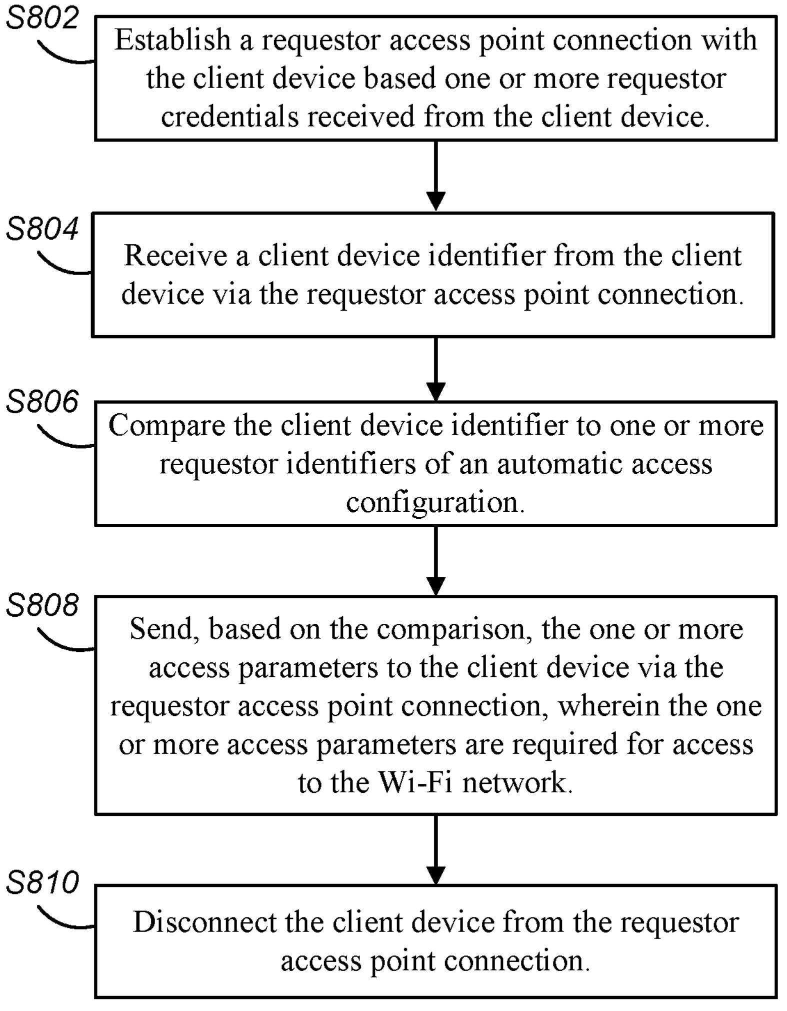
FIG. 8 is a flow chart illustrating a method for automatically authorizing sending one or more access parameters associated with a Wi-Fi network to a client device so as to provide the client device access to the Wi-Fi network, according to one or more aspects of the present disclosure.

FIG. 8 is a flow chart illustrating a method for automatically authorizing sending one or more access parameters associated with a Wi-Fi network to a client device so as to provide the client device access to the Wi-Fi network, according to one or more aspects of the present disclosure. In one or more embodiments, an access point device 2 may include a controller 26, such as a device controller or HNC, that may be programmed with or to execute one or more instructions (for example, software or application 25) to perform steps for providing to a client device access to a Wi-Fi network associated with the access point device 2. In FIG. 8, it is assumed that all client devices include their respective controllers and their respective software stored in their respective memories, as discussed above in reference to FIGS. 1-7, which when executed by their respective controllers perform the functions and operations in accordance with the example embodiments of the present disclosure.

The controller 26 executes one or more computer-readable instructions, stored in a memory, for example, a memory 24 of an access point device 2, that when executed perform one or more of the operations of steps S802-S810. In one or more embodiments, the one or more computer-readable instructions may be one or more software applications, for example, a software 25 of an access point device 2. While the steps S802-S810 are presented in a certain order, the present disclosure contemplates that any one or more steps can be performed simultaneously, substantially simultaneously, repeatedly, in any order or not at all (omitted).

At step S802, the access point device 2 establishes a requestor access point connection with the client device based on one or more requestor credentials received from the client device 2. In one or more embodiments, the establishing the requestor access point connection can comprise comparing the one or more requestor credentials to a requestor identifier of an automatic access configuration, wherein the requestor identifier comprises a device identifier, a user identifier, or both. In one or more embodiments, the requestor access point connection is a secure connection. In one or more embodiments, an access point device 2 can receive one or more automatic access configuration parameters from the client device 4 via the requestor access point connection and use the one or more automatic access configuration parameters to update the automatic access configuration after which the process can end.

At step 804, the access point device 2 receives a client device identifier from the client device 4 via the requestor access point connection. In one or more embodiments, the client device identifier can be included in or as part of a probe request message sent from the client device 4. The access point device 2 can then send a probe response message to the client device 4 that comprises the one or more requestor credentials. The probe request response can comprise a vendor specific information element, and wherein the vendor specific information element comprises a requestor service set identifier (SSID), a requestor password, or both At step S806, the access point device 2 compares the client device identifier to one or more requestor identifiers of an automatic access configuration.

At step S808, the access point device 2 sends, based on the comparison of step S806, the one or more access parameters to the client device via the requestor access point connection, wherein the one or more access parameters are required for access to the Wi-Fi network. In one or more embodiments, the one or more access parameters comprise an update for one or more of the one or more access parameters. In one or more embodiments, the access point device 2 receives, from a network resource, one or more network credentials associated with one or more access point devices, wherein the one or more access point devices are associated with one or more Wi-Fi networks, and sending the one or more network credentials to the client device so as to allow the client device to access one or more of the one or more Wi-Fi networks.

At step S810, the access point device 2 disconnects the client device 4 from the requestor access point connection. The client device 4 can the proceed with sending the one or more access parameters to the access point device 2 so as to access the Wi-Fi network associated with the access point device 2.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. An access point device for automatically authorizing a client device to receive one or more access parameters associated with a wireless fidelity (Wi-Fi) network provided by or associated with the access point device, the access point device comprising:

a memory storing one or more computer-readable instructions; and a processor configured to execute the one or more computer-readable instructions to:

establish a requestor access point connection with the client device based on one or more requestor credentials received from the client device, wherein the requestor access point connection provides secure communications between the access point device and the client device without providing access to the Wi-Fi network such that a message can only be exchanged between the access point device and the client device;

receive a client device identifier from the client device via the requestor access point connection;

compare the client device identifier to one or more requestor identifiers of an automatic access configuration, wherein the automatic access configuration stores information associated with providing automatic access to the Wi-Fi network;

send, based on the comparison, the one or more access parameters to the client device via the requestor access point connection, wherein the one or more access parameters are required for access to the Wi-Fi network;

receive a customization instruction from the client device, wherein the customization instruction updates the automatic access configuration; and disconnect the client device from the requestor access point connection.

2. The access point device of claim 1, wherein the processor is further configured to execute the one or more computer-readable instructions to:

receive a probe request message from the client device via the requestor access point connection, wherein the probe request message comprises the client device identifier; and send a probe response message to the client device via the requestor access point connection, wherein the probe response message comprises the one or more requestor credentials.

3. The access point device of claim 2, wherein the probe request response comprises a vendor specific information element which includes a requestor service set identifier (SSID), a requestor password, or both.

4. The access point device of claim 1, wherein the establishing the requestor access point connection with the client device comprises:

comparing the one or more requestor credentials to one or more requestor identifiers of the automatic access configuration, wherein the one or more requestor identifiers comprise a device identifier, a user identifier, or both.

5. The access point device of claim 1, wherein the processor is further configured to execute the one or more computer-readable instructions to:

receive, from a network resource, one or more network credentials associated with one or more access point devices, wherein the one or more access point devices are associated with one or more Wi-Fi networks; and send the one or more network credentials to the client device so as to allow the client device to access the one or more Wi-Fi networks.

6. The access point device of claim 1, wherein the customization instruction performs a bulk update of at least part of the automatic access configuration.

7. The access point device of claim 6, wherein the bulk update changes an electronic mail address, a uniform resource locator, or a password of the automatic access configuration.

8. A method for automatically authorizing a client device to receive one or more access parameters associated with a wireless fidelity (Wi-Fi) network provided by or associated with the access point device, the method comprising:

establishing a requestor access point connection with the client device based on one or more requestor credentials received from the client device, wherein the requestor access point connection provides secure communications between the access point device and the client device without providing access to the Wi-Fi network such that a message can only be exchanged between the access point device and the client device;

receiving a client device identifier from the client device via the requestor access point connection;

comparing the client device identifier to one or more requestor identifiers of an automatic access configuration, wherein the automatic access configuration stores information associated with providing automatic access to the Wi-Fi network;

sending, based on the comparison, the one or more access parameters to the client device via the requestor access point connection, wherein the one or more access parameters are required for access to the Wi-Fi network;

receiving a customization instruction from the client device, wherein the customization instruction updates the automatic access configuration; and disconnecting the client device from the requestor access point connection.

9. The method of claim 8, further comprising:

receiving a probe request message from the client device via the requestor access point connection, wherein the probe request message comprises the client device identifier; and sending a probe response message to the client device via the requestor access point connection, wherein the probe response message comprises the one or more requestor credentials.

10. The method of claim 9, wherein the probe request response comprises a vendor specific information element which includes a requestor service set identifier (SSID), a requestor password, or both.

11. The method of claim 8, wherein the establishing the requestor access point connection with the client device comprises:

comparing the one or more requestor credentials to one or more requestor identifiers of the automatic access configuration, wherein the one or more requestor identifiers comprise a device identifier, a user identifier, or both.

12. The method of claim 8, further comprising:

receiving, from a network resource, one or more network credentials associated with one or more access point devices, wherein the one or more access point devices are associated with one or more Wi-Fi networks; and sending the one or more network credentials to the client device so as to allow the client device to access the one or more Wi-Fi networks.

13. The method of claim 8, wherein the customization instruction performs a bulk update of at least part of the automatic access configuration.

14. The method of claim 13, wherein the bulk update changes an electronic mail address, a uniform resource locator, or a password of the automatic access configuration.

15. A non-transitory computer-readable medium of an access point device storing one or more computer-readable instructions for automatically authorizing a client device to receive one or more access parameters associated with a wireless fidelity (Wi-Fi) network provided by or associated with the access point device, the one or more computer-readable instructions that when executed by a processor of the access point device cause the access point device to perform one or more operations comprising:

establishing a requestor access point connection with the client device based on one or more requestor credentials received from the client device, wherein the requestor access point connection provides secure communications between the access point device and the client device without providing access to the Wi-Fi network such that a message can only be exchanged between the access point device and the client device;

receiving a client device identifier from the client device via the requestor access point connection;

comparing the client device identifier to one or more requestor identifiers of an automatic access configuration, wherein the automatic access configuration stores information associated with providing automatic access to the Wi-Fi network;

sending, based on the comparison, the one or more access parameters to the client device via the requestor access point connection, wherein the one or more access parameters are required for access to the Wi-Fi network;

receiving a customization instruction from the client device, wherein the customization instruction updates the automatic access configuration; and disconnecting the client device from the requestor access point connection.

16. The non-transitory computer-readable medium of claim 15, wherein the one or more operations further comprise:

receiving a probe request message from the client device via the requestor access point connection, wherein the probe request message comprises the client device identifier; and sending a probe response message to the client device via the requestor access point connection, wherein the probe response message comprises the one or more requestor credentials.

17. The non-transitory computer-readable medium of claim 15, wherein the probe request response comprises a vendor specific information element which includes a requestor service set identifier (SSID), a requestor password, or both.

18. The non-transitory computer-readable medium of claim 15, wherein the one or more operations further comprise:

receiving, from a network resource, one or more network credentials associated with one or more access point devices, wherein the one or more access point devices are associated with one or more Wi-Fi networks; and sending the one or more network credentials to the client device so as to allow the client device to access the one or more Wi-Fi networks.

19. The non-transitory computer-readable medium of claim 15, wherein the customization instruction performs a bulk update of at least part of the automatic access configuration.

20. The non-transitory computer-readable medium of claim 19, wherein the bulk update changes an electronic mail address, a uniform resource locator, or a password of the automatic access configuration.

* * * * *